United States Patent [19]

Disrud

[11] Patent Number: 5,501,318
[45] Date of Patent: Mar. 26, 1996

[54] OVERHEAD PUSHER LUG ASSEMBLY FOR PACKAGING MACHINES

[75] Inventor: Jeff A. Disrud, Marietta, Ga.

[73] Assignee: Riverwood International Corporation, Atlanta, Ga.

[21] Appl. No.: 271,297

[22] Filed: Jul. 6, 1994

[51] Int. Cl.$^6$ .................................................. B65G 19/26
[52] U.S. Cl. ............................................ 198/732; 198/728
[58] Field of Search ...................................... 198/717, 725, 198/728, 731, 732, 733

[56] References Cited

U.S. PATENT DOCUMENTS

| 3,993,188 | 11/1976 | Muller | 198/717 X |
| 4,749,079 | 6/1988 | Minto | 198/718 X |
| 5,042,636 | 8/1991 | Underwood | 198/732 X |

FOREIGN PATENT DOCUMENTS

| 1407885 | 7/1988 | U.S.S.R. | 198/728 |
| 0548455 | 10/1942 | United Kingdom | 198/732 |

*Primary Examiner*—James R. Bidwell

[57] ABSTRACT

An overhead pusher lug assembly for stabilizing the top portions of cartons in a carton packaging machine comprises an endless chain conveyor having an array of pusher lugs rotatably mounted thereto at spaced intervals. The lugs are rotatable between a first position wherein the lugs extend upwardly from the lower flight of the conveyor and a second position wherein the lugs extend downwardly from the lower flight of the conveyor for insertion between adjacent cartons on a carton conveyor. As the pusher lugs move onto the lower flight of the conveyor, they engage the end of an elongated bar, which rotates or flips the pusher lugs into place between underlying cartons so that the lugs do not impact and disfigure trailing cartons on the carton path.

12 Claims, 5 Drawing Sheets

OVERHEAD PUSHER LUG ASSEMBLY FOR PACKAGING MACHINES

TECHNICAL FIELD

This invention relates generally to article packaging machines of the type used to package beer and soft drink containers into six, twelve, and twenty-four pack cartons. More particularly, the invention relates to an overhead pusher lug mechanism that functions in conjunction with the carton conveyor to stabilize cartons as they are conveyed progressively through the packaging machine.

BACKGROUND OF THE INVENTION

Article packaging machines are commonly used to package articles such as soft drinks and beer into cartons for storage and display. An example of such a packaging machine is shown in U.S. patent application Ser. No. 08/118,111. In general, most article packaging machines include a conveyor for moving cartons along a path in spaced sequential relationship. As the cartons are conveyed along the path, adjacent sections of the machine function to insert articles such as beverage cans into the cartons whereupon the cartons are progressively sealed and moved out of the machine for collection and transport.

Most carton conveyors in packaging machines include a conveyor bed having spaced arrays of upstanding lugs that function to space the cartons on the conveyor bed and push them along the path in their spaced sequential relationship for packaging. In some packaging machines, such as that disclosed in the referenced patent application, the spacing between the conveyor lugs is variable to accommodate cartons of different widths. For example, in beverage container packaging machines, cartons are commonly either 5¼ inches wide or 11¼ inches wide depending upon the number of articles packaged in the carton. Thus, conveyor lugs on these machines generally are adjustable to provide either 6 inch or 12 inch spacing between lugs to accommodate cartons of either width.

A common problem with article packaging machines, and with beverage container packaging machines in particular, is that the top portions of empty open cartons being conveyed along the path tend to drag or lag behind the bottom portions that are held in place and pushed by the conveyor lugs. This causes the cartons to become deformed as they move along the path. As a result, articles cannot be inserted easily into the cartons and, in fact, can impact the skewed cartons causing a machine jam. To address this problem, many packaging machines employ an overhead pusher lug assembly to support and brace the top portions of cartons as they move along the path. While such overhead pusher lug assemblies vary in detailed operation, in general they comprise an endless flexible conveyor such as a chain having a lower flight that is positioned above the tops of the cartons and moves along in synchronization therewith. An array of downwardly projecting lugs are fixed to the chain and extend into the spaces between cartons to engage and support the top portions of cartons as they move along the path. As a result, the cartons are maintained in their square undeformed orientations for easy insertion of articles.

In the past, overhead pusher lug assemblies have exhibited numerous problems and shortcomings. For example, it is desirable that the lugs of the assembly extend as far as possible into the space between the cartons to provide maximum area of engagement for supporting the cartons. Unfortunately, the length of the lugs is naturally limited by the close spacing of the cartons on the conveyor. For example, as each lug moves around its drive sprocket at the upstream end of the carton conveyor and onto the lower flight of its conveyor, it also moves into the position between two adjacent cartons. If the lug is too long or if the carton spacing is a bit less than expected, the lug will impact the top corner of the trailing carton as it rounds the sprocket thereby deforming the carton. As a result, the entire packaging machine must be shut down and the deformed carton replaced before the packaging operation can be resumed.

Another problem with prior art overhead pusher lug mechanisms is that they have not been easily adaptable to cartons of different widths. Usually, when setting up the machine for a different width carton, lugs on the overhead pusher lug assembly have to be manually removed and refixed to their conveyor chain at the desired spaced intervals. Obviously, such a procedure is time consuming and requires the knowledge and resources of valuable trained personnel. Such manual adjustment of the overhead pusher lug spacing is particularly troublesome on modern beverage packaging machines where the lugs on the carton conveyor itself typically are easily and quickly adjustable.

Accordingly, there exists a continuing and heretofore unaddressed need for an efficient effective overhead pusher lug assembly for packaging machines wherein the size of the individual lugs is not unreasonably limited by the danger of the lugs impacting and deforming cartons as they move around their sprockets and between the cartons on the carton conveyor. A further need exists for an overhead pusher lug assembly that is quickly and easily adjustable to accommodate cartons of different widths on the carton conveyor. It is to the provision of such an overhead pusher lug assembly that the present invention is primarily directed.

SUMMARY OF THE INVENTION

Briefly described, the present invention, in a preferred embodiment thereof, comprises an overhead pusher lug assembly for supporting the top portions of open empty cartons in an article packaging machine as the cartons are moved in spaced sequential fashion along a carton conveyor. The assembly comprises an endless flexible chain conveyor having an upper flight and a lower flight. The lower flight of the chain conveyor is positioned to overlie cartons on the path and is oriented substantially parallel to the direction of carton movement along the path. The conveyor chain extends around and is driven by a pair of spaced sprockets with one sprocket being positioned at the upstream end of the carton conveyor and the other sprocket being positioned at the downstream end of the carton conveyor. The conveyor chain is driven to move its lower flight in the direction of and in synchronization with the carton conveyor.

An array of generally triangular pusher lugs are rotatably mounted at spaced intervals along the chain conveyor. Each of the pusher lugs is rotatable on the conveyor between a first position wherein the lug projects generally upwardly from the lower flight of the conveyor in a direction away from the carton path and a second position wherein the lug projects generally downwardly from the lower flight of the conveyor in a direction toward the carton path. The pusher lugs are sized such that, when they are in their second positions on the lower flight of the conveyor, they project into the spaces between cartons on the path and bear against the upper top portion of leading cartons to support, stabilize, and help push the cartons along the path.

In the preferred embodiment, the pusher lugs on the chain conveyor are arranged in a first longitudinally aligned array and a second longitudinally aligned array that is laterally displaced from the first array. A first retaining bar extends generally along and just above the lower flight of the conveyor and is aligned with the lugs of the first array. Similarly, a second retainer bar extends along the lower flight of the conveyor beside the first bar and is aligned with the second array of pusher lugs. One or both of the retaining bars is retractable out of the path of the lugs for purposes described in more detail below.

Each of the retainer bars has a contoured end portion located beside the sprocket at the upstream end of the pusher lug assembly. The end portions of each retainer bar are positioned to engage the pusher lugs in the array with which the bar is aligned as the lugs move around the upstream sprocket and onto the lower flight of the conveyor. This causes the lugs to rotate or flip from their first lock positions to their second positions as they move onto the lower flight of the conveyor chain. The conveyor chain is synchronized with the movement of cartons along the carton path so that the rotation of the pusher lugs causes each lug to be flipped into position between two adjacent cartons on the path just as the lug rounds the sprocket and moves onto the lower flight of the conveyor chain. Since the lugs are flipped into position at the proper time rather than simply moving around the sprocket into position, the possibility that a lug will impact and deform one of the cartons on the path is virtually eliminated. As the rotated pusher lugs move along the lower flight of the conveyor supporting cartons below, their top edges ride along and against the bottom edge of their retainer bar, which holds them down and prevents them from being flipped back up while they help push the cartons along the carton path.

If both retainer bars are in their operable positions, then each lug in both of the lug arrays along the conveyor chain is engaged by its respective bar and is flipped or rotated into the space between adjacent cartons. Therefore, cartons having a width corresponding to the distance between adjacent lugs on the conveyor chain are accommodated by this arrangement. However, when one of the retainer bars is raised into its inoperable position, the other pusher bar engages and rotates only the lugs of its lug array; i.e., only every other pusher lug on the conveyor chain. The lugs of the other array are not rotated and stay in their first locked positions extending upwardly in inoperable orientations away from cartons on the carton path. Thus, cartons having a width corresponding to the distance between every other lug are accommodated by this arrangement. Accordingly, the pusher lug assembly of this invention is quickly and easily adjustable to accommodate cartons having different widths simply by raising or lowering one of the retainer bars that flip the lugs into position between cartons.

As the pusher lugs move off of the lower flight of the conveyor chain, they travel up and around the downstream sprocket and onto the upper flight of the conveyor chain. Here, they encounter and engage a cam block that flips or rotates them back to their first locked positions before they again move around the upstream sprocket and onto the lower flight of the conveyor. Thus, the process is repeated over and over with the pusher lugs functioning to support and help push along the top portions of cartons being conveyed along a carton path.

Thus, an overhead pusher lug assembly is now provided wherein the pusher lugs are flipped into position between adjacent cartons on the carton path so that they do not impact and deform cartons on the path. In addition, the pusher lug assembly of this invention is easily adaptable to accommodate cartons of different widths simply by raising or lowering the appropriate retainer bar as needed. These and other objects, features, and advantages of the invention will become more apparent upon review of the detail description provided below when taken in conjunction with the accompanying drawings, a brief description of which follows.

DETAILED DESCRIPTION OF THE PREFERRED EMBODIMENT

Figure 1:
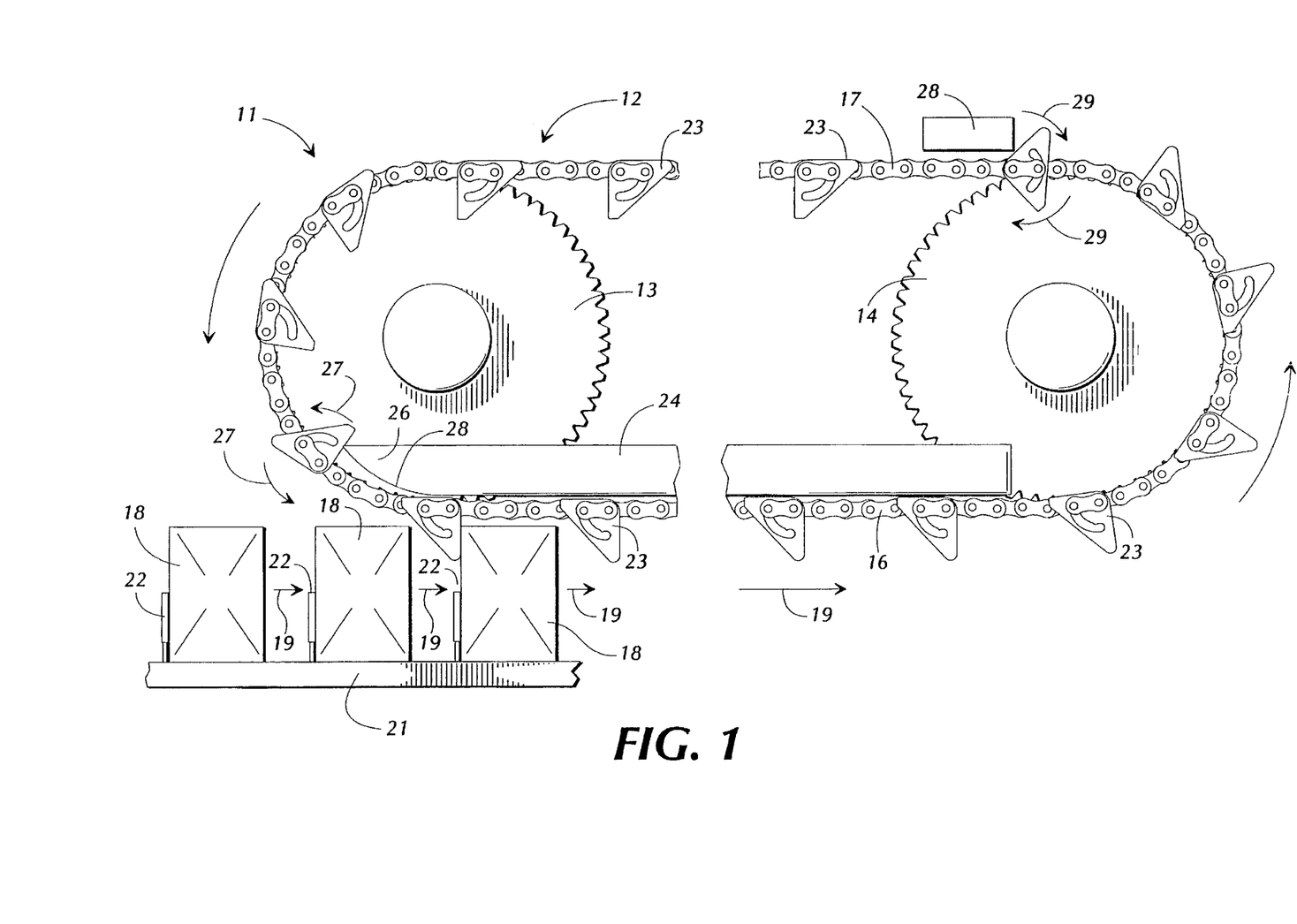
FIG. 1 is a side elevational view of an overhead pusher lug assembly that embodies principals of this invention in a preferred form.
Figure 2:
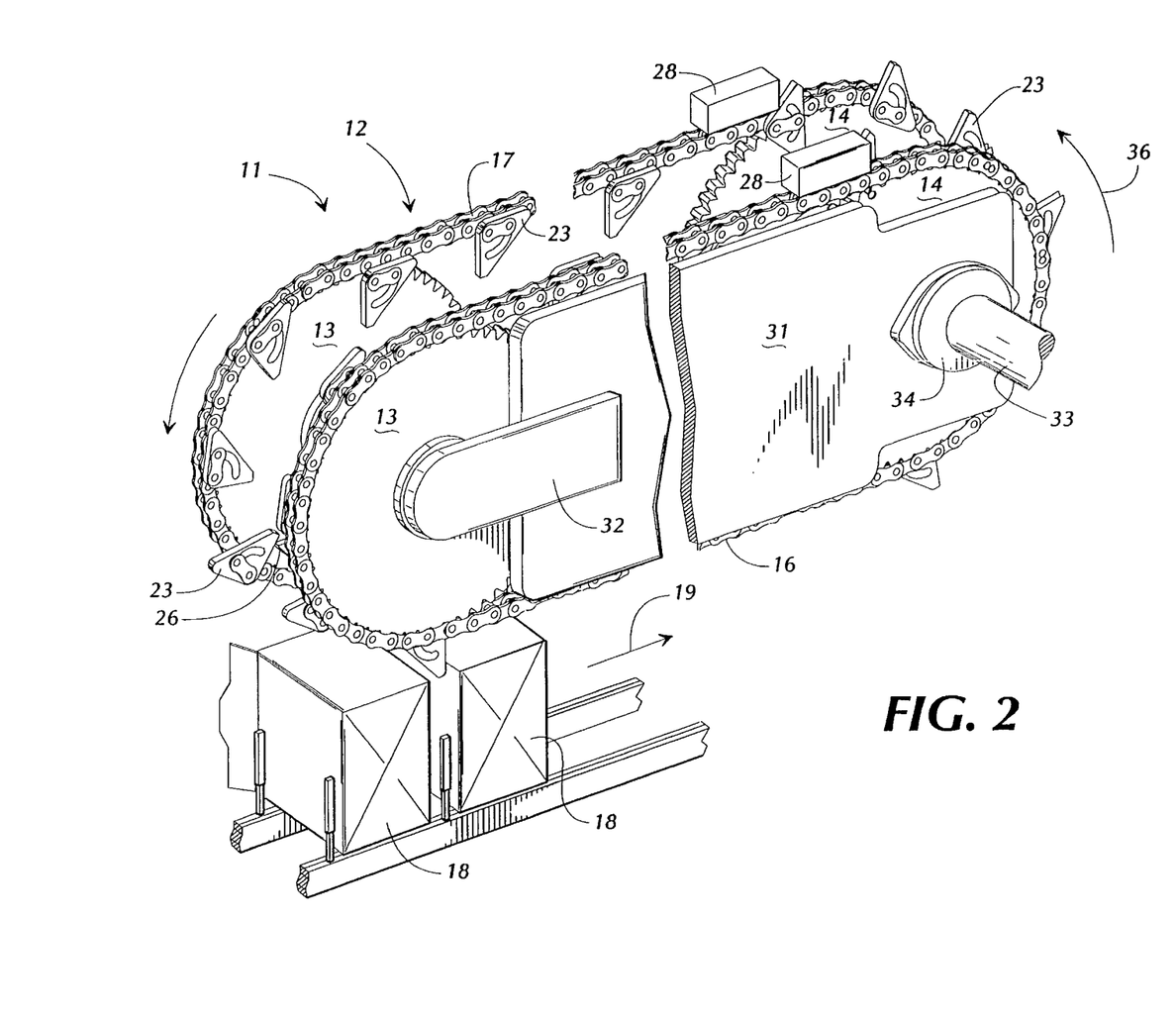
FIG. 2 is a perspective view of a pusher lug that embodies principals of this invention.
Figure 3:
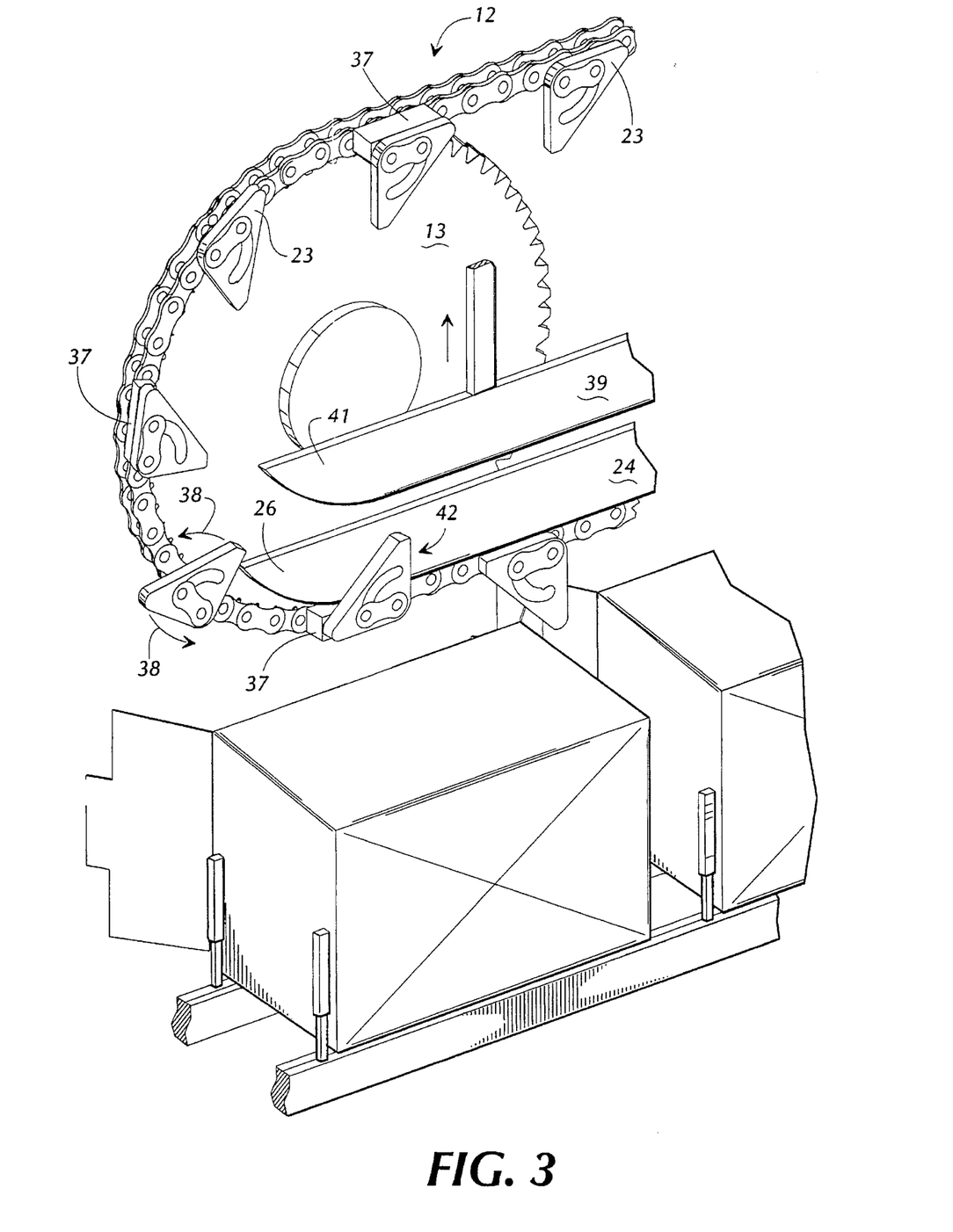
FIG. 3 is a partial perspective view showing the upstream end of the pusher lug assembly with the retractable retainer bars that provide for easy adaptability of the assembly.

Referring now in more detail to the drawings, in which like numerals refer to like parts throughout the several views, FIGS. 1–3 illustrate an overhead pusher lug assembly that embodies principals of the present invention in a preferred form. In these figures, the size of the pusher lug mechanism has been exaggerated relative to the size of the cartons and the carton conveyor in order to depict clearly the functional details of the invention. In a functioning packaging machine, the overhead pusher lug mechanism likely would be smaller and more compact relative to the size of the cartons than is shown in FIGS. 1–3.

FIG. 1 illustrates an overhead pusher lug mechanism 11 comprising an endless flexible lug conveyor chain 12 that extends about an upstream sprocket 13 and a downstream sprocket 14. With this embodiment, the chain 12 defines a lower flight 16 and an upper flight 17.

The mechanism 11 is designed to be incorporated in and function with an article packaging machine wherein cartons 18 are conveyed and spaced sequential relationship along a carton path in the direction indicated by arrows 19 in FIG. 1. Usually, the cartons 18 are supported on a carton conveyor mechanism 21 having arrays of spaced upstanding lugs 22 that space and push the cartons along the path.

Since the cartons 18 usually are open as they move along the path, they can be rather flimsy. As a result, and since modern packaging machines operate at high rates of speed, the top portions of the cartons tend to lag a bit behind the lower portions, causing the cartons to become skewed and deformed as they move along the carton path. This, in turn, can cause articles such as beverage containers to impact the sides of the deformed cartons as the articles are inserted into the cartons, causing the cartons to crumple, requiring shutdown of the machine for clean-out. As discussed above, the present invention functions to stabilize and push along the top portions of the cartons to maintain the square geometry of the cartons and avoid problems resulting from misinsertion of articles into deformed cartons.

The lower flight 16 of the endless conveyor chain 12 is positioned to extend just above the tops of cartons 18 on the carton conveyor and is oriented along the direction of carton movement on the path. One or both of the sprockets 13 and 14 is driven by an appropriate drive motor (not shown) to move the lower flight 16 of the chain in the same direction as carton movement and at a rate that is synchronized with the rate at which the cartons are conveyed along their path.

A plurality of generally triangular pusher lugs 23 are pivotally mounted at spaced intervals along the endless conveyor chain 12. The details of each pusher lug and its attachment to the chain are described more fully below. In general, however, each lug is pivotable or rotatable between a first position in which the lug extends inwardly of the conveyor mechanism as illustrated on the upper flight of the chain in FIG. 1, and a second position wherein the lug extends outwardly and away from the conveyor chain as illustrated on the lower flight of the chain in FIG. 1. The lugs are spaced apart a distance corresponding to the distance between the trailing sides of adjacent cartons on the path. That is, they are spaced apart a distance corresponding to the spacing of lugs on the carton conveyor. Further, the chain 12 is synchronized relative to the carton conveyor mechanism so that the lugs on the lower flight 16 extend downwardly and into the spaces between adjacent cartons on the path and bear against the upper trailing edge portions of cartons as the cartons move along the path. Since the chain is driven to move its lower flight 16 at the same rate as the cartons, the lugs move along with the cartons and support their top trailing edges to stabilize the cartons and prevent them from lagging and becoming deformed as they move along the carton path. As a result, the cartons are held square and articles can be inserted with a greatly reduced risk of misinsertion. After the articles are inserted, the cartons move on beyond the overhead pusher lug assembly 11 where they are sealed and pass away from the packaging machine.

A rigid elongated retainer rod 24 extends along and just above the lower flight 16 of the conveyor chain 12. The rod 24 is vertically aligned with the pusher lugs 23 and has a contoured end portion 26 disposed at the upstream end of the pusher lug mechanism. The end portion 26 is formed with a point that is positioned to engage the lugs as they move around the upstream sprocket 13 and onto the lower flight 16 of the chain 12. As illustrated by arrows 27 in FIG. 1, when a lug in its first position engages the point of the rod 24, the lug is forced by continued movement of the chain to rotate or pivot from its first inwardly extending position to its second outwardly projecting position. The contoured end portion 26 of the rod 24 has a curved lower surface 28 that is configured to continue and complete the rotation of the pusher lugs as they complete their movement around the sprocket 13 and move onto the lower flight 16 of the chain 12. Since the chain is driven in synchronization with the cartons 18, this rotation or flipping of the pusher lugs causes the lugs to flip into position between two cartons and come to rest against the upper trailing edge of the forward carton. The rotational flipping of the pusher lugs in conjunction with the synchronized movement of the chain causes the lugs to be inserted neatly between adjacent cartons as each lug completes its movement around the upstream sprocket to avoid impact between the lugs and the leading top portions of trailing cartons on the conveyor. As a result, the lugs can be made as long as reasonably necessary without danger of their impacting and deforming cartons on the conveyor as they move around the sprocket and into place between the cartons.

Once a lug has been completely flipped into position by the end portion 26 of the rod 24, it moves onto and along the lower flight 16 of the conveyor chain 12. In doing so, the lug bears against the upper trailing edge of a carton to stabilize the carton for insertion of articles. To prevent the lugs 23 from being flipped back toward their first positions by the force of the cartons, the upper legs of the lugs bear against the bottom of the rod 24 as the lugs move along the lower flight 16. The retainer bar 24 thus holds the lugs securely in their second positions extending downwardly between the cartons all along the length of the lower flights 16. Thus, the top portions of the cartons 18 are firmly stabilized by the lugs 23 such that articles can be inserted without incident.

Once cartons have moved along the carton path and articles have been inserted into the cartons, there no longer is a need to support the top portions of the cartons. At this point, the lugs 23 move beyond the retainer bar 24 and upwardly around the downstream sprocket 14 to the upper flight 17 of the chain 12. A pivot block 28 is disposed along the upper flight 17 of the chain 12 and is positioned to engage the pusher lugs 23 as the lugs move back along the upper flight. When the lugs 23 engage the pivot block 28 they are forced by continued movement of the chain to rotate as indicated by arrows 29 back to their first positions extending inwardly of the endless conveyor chain 12. The pusher lugs are thus "reset" in preparation for their next entry onto and traverse along the lower flight 16 of the chain. The pivot block 28 is positioned in FIG. 1 to engage and reset the pusher lugs just as they leave the downstream sprocket 14. It will be understood, however, that the pivot block can be located at any convenient position along the chain so long as the lugs engage the pivot block and are reset prior to being flipped back into position by the end 26 of the retainer bar 24.

FIG. 2 illustrates in perspective form and in more detail an overhead pusher lug assembly preferred for use in an actual packaging machine. The assembly 11 comprises tandem endless conveyor chain mechanisms 12, each of which is a mirror image of the other and functions substantially as described above with respect to FIG. 1. Each of the endless conveyor chains is provided with spaced pusher lugs 23 that are pivotally mounted along a chain. The upstream sprockets 13 and downstream sprockets 14 are supported by metal plates 31 and tension arms 32 to maintain the chains 12 in a tight relationship about the sprockets 13 and 14. A drive shaft 33 is rotatably journaled in appropriate bearings 34 and is fixed to the downstream sprockets 14. The drive shaft 33 is driven by an appropriate drive motor (not shown) to rotate the downstream sprockets 14 in the direction of arrow 36 to drive the endless chain conveyors as described. The drive shaft 33 is driven at the rate required to move the lower flight 16 of the chains 12 in synchronization with the cartons 18 on the carton path.

Each of the endless conveyor chain mechanisms is provided with elongated retainer rods 24 having end portions 26 that engage and flip the pusher lugs into position between cartons on the carton path. In addition, each of the endless chain conveyors is provided with a pivot block 28 positioned to engage and reset the pusher lugs 23 to their first inwardly extending positions as shown.

As discussed above, most article packaging machines are adapted to operate with cartons of more than one size. For example, in a beverage container packaging machine, it is common for the machine to be able to accommodate six, twelve, and twenty-four-pack cartons of beverage containers. By way of example, six-pack beverage cartons typically are approximately 5¼ inches wide while twelve-pack cartons typically are approximately 11¼ inches wide. The cartons are commonly spaced approximately ¾ inch apart on the carton conveyor. Accordingly, it is necessary for the pusher lugs of the overhead pusher lug assembly to be spaced apart six inches when accommodating six-pack cartons and to be spaced apart 12 inches when accommodating twelve-pack cartons.

To accommodate different size cartons without the necessity of removing and reorganizing pusher lugs on the endless conveyor chains, the pusher lugs in one preferred embodiment of the present invention are arranged along their chains in a first longitudinally aligned array and a second longitudinally aligned array that is laterally displaced relative to the first array. In addition, two side-by-side retainer bars 24 extend along the lower flight of each chain with the first bar being vertically aligned with the first array of pusher lugs and the second bar being vertically aligned with the second array of pusher lugs. With this configuration, each of the arrays of pusher lugs and its corresponding retainer bar functions independently of the other array for insertion of the lugs of the array into place between cartons on the carton conveyor.

In the preferred embodiment, one or both of the retainer bars 24 is retractable up and away from its associated pusher lug array. When the bar is retracted, it does not engage the ends of the lugs of its corresponding array when the lugs move around the upstream sprocket and onto the lower flight of the conveyor chain. Accordingly, the lugs of that array stay in their first or inoperative positions extending inwardly of the conveyor chain and have no affect on cartons beneath the assembly.

With the just described arrangement, it can be seen that with both of the retainer bars in their lowered operable positions, each of the adjacent lugs along both arrays on the conveyor chain is flipped into position extending between the cartons on the carton conveyor. However, when one of the retainer bars is retracted, the lugs of its array are not affected and only the lugs of the other array are flipped into position. Thus, with this arrangement, only every other lug on the chain is flipped into position between cartons on the carton conveyor.

As an example, with the six and twelve inch wide cartons mentioned above, adjacent lugs are spaced apart six inches along the chain, the lugs in each separate array being spaced apart twelve inches. Thus, when both retainer bars are in their operable positions, all of the lugs in each array are flipped down to accommodate cartons spaced at six inch intervals. However, when accommodating twelve inch interval cartons, one of the elongated retainer bars is retracted so that only one of the lug arrays is flipped to provide overhead pusher lugs at twelve inch intervals. Thus, the overhead pusher lug assembly of this invention is quickly and easily adaptable to two different sized cartons simply by proper placement of the elongated retainer bars that flip the lugs downwardly between the cartons.

FIG. 3 illustrates the off-set pusher lug arrays and corresponding retainer bars for each array. In FIG. 3, one of the retainer bars is shown retracted to adapt the overhead pusher lug assembly for operation with wider cartons. As with FIG. 1, the conveyor chain 12 is seen to bear a plurality of triangular shaped pusher lugs 23 rotatably attached at spaced intervals to the chain. Alternating ones of the pusher lugs 23 are spaced from the chain 12 by a spacer block 37. The spacer blocks 37 preferably are formed to be slightly wider than the pusher lugs 23. In this way, the lugs 23 are arranged on the chain 12 into a first longitudinally aligned array comprising the pusher lugs mounted directly to the chain and a second longitudinally aligned array comprising the lugs mounted on the spacer blocks 37. The second longitudinally aligned array of pusher lugs is laterally displaced by the spacer blocks 37 relative to the first array of pusher lugs. Thus, the lugs of the first array and the lugs of the second array move in distinctly different and independent paths as the chain is driven about its sprockets.

A first elongated retainer bar 24 extends along the lower flight of the chain conveyor and is vertically aligned with the first array of pusher lugs. The end portion 26 of the bar 24 is positioned, as in FIG. 1, to engage the pusher lugs as they move onto the lower flight of the conveyor and flip them as indicated by arrows 38 into position between adjacent cartons on the carton path. With this arrangement, the pusher lugs in the first aligned array of lugs are flipped and held in their operable positions as they move onto and along the lower flight of the conveyor chain.

A second elongated retainer bar 39 having a contoured end 41 extends along the length of the lug conveyor and is vertically aligned with the pusher lugs in the second array mounted on spacer blocks 37. In FIG. 3, the second retainer bar 39 is shown in its retracted position displaced from the lugs as they move along the lower flight of the conveyor. With the second retainer bar in this position, the lugs of the second array are not engaged and flipped over as they move on to the lower flight of the conveyor. Thus, the lugs of the second array remain in their inoperable inwardly extending orientations as shown at 42 as they move onto and along the lower flight of the conveyor chain. Thus, the lugs in this array have no affect on cartons moving along the path when their corresponding rod 39 is in its retracted position as shown in FIG. 3.

Conversely, however, when the second elongated retainer rod 39 is moved downwardly into its operable position adjacent to the rod 24, it engages the pusher lugs of the second array and flips them over as well into their downwardly extending operable positions as they move on to the lower flight. With such a configuration, every lug on the conveyor chain is flipped downwardly as it moves on to the lower flight to accommodate narrower cartons that are spaced along the carton conveyor a distance corresponding to the distance between adjacent lugs on the overhead pusher lug assembly. With the retainer bar 39 retracted as shown in FIG. 3, the overhead pusher lug assembly is adapted to accommodate wider cartons spaced along the carton conveyor a distance corresponding to the distance between every other lug on the overhead pusher lug assembly. It can thus be seen that the overhead pusher lug assembly of this invention is quickly and easily adaptable to narrower and wider cartons simply by raising or lowering the second elongated rigid bar 39 as necessary.

Although not shown in FIG. 3, it will be understood that, like FIGS. 1 and 2, the pusher lugs are reset back to their first inwardly extending positions by appropriately positioned pivot blocks mounted on the assembly. In this way, all of the lugs are reset at the top of the assembly in preparation for the proper orientation as they move onto and along the lower flight of the assembly.

Figure 4:
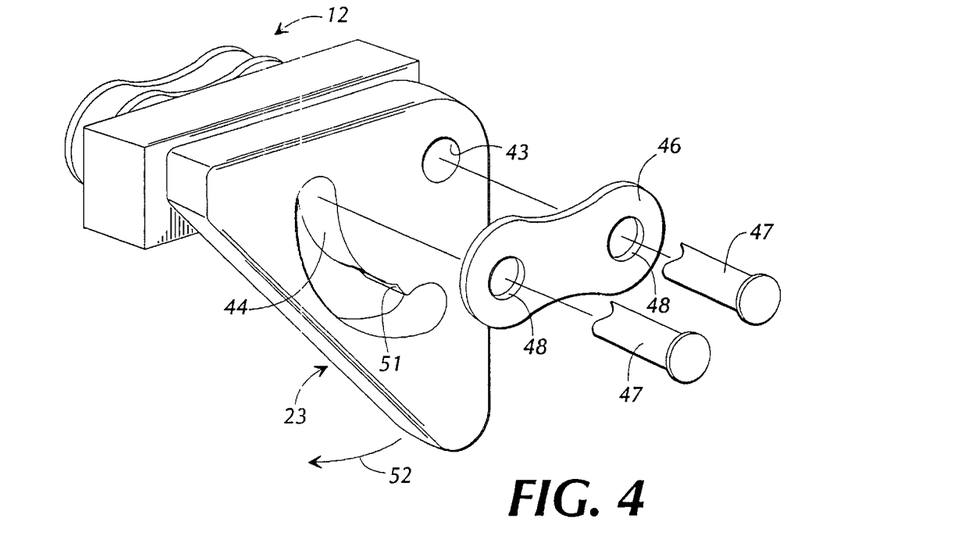
FIGS. 4–6 demonstrate attachment of the pusher lugs to the conveyor chain with the lugs being aligned in two laterally displaced arrays.
Figure 5:
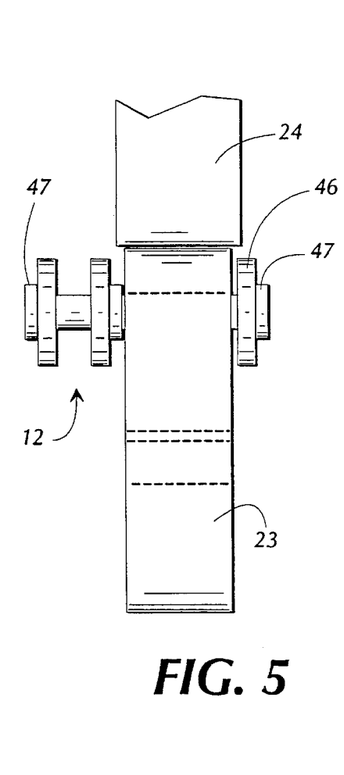
Figure 6:
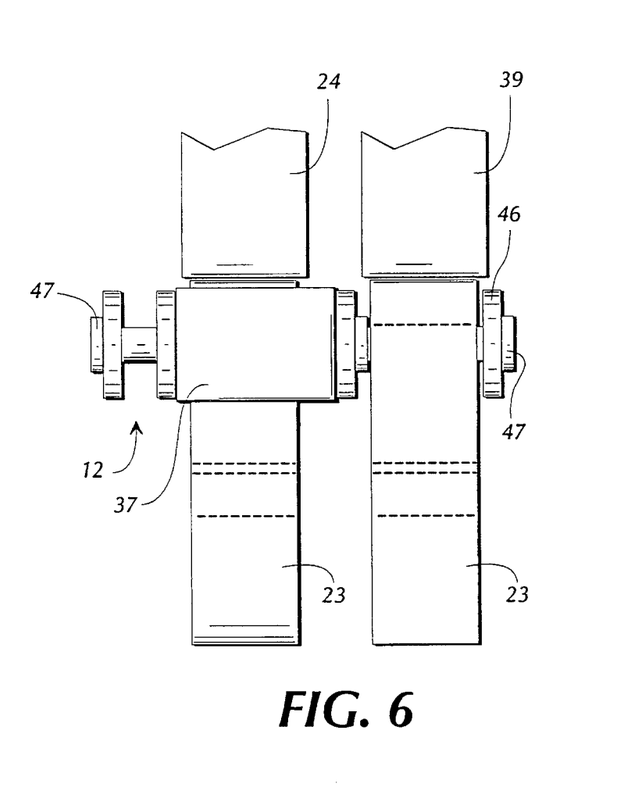

FIGS. 4, 5, and 6 illustrate the detail construction of the overhead pusher lugs 23 and the mounting of the lugs to the conveyor chain 12. Each of the pusher lugs 23 preferably is formed of a rigid durable plastic material and has a generally right triangular shape. The lug 23 is formed with a through-bore 43 at the apex of the triangle and a crescent notch 44 that is spaced from and concentric with the through-bore 43. The lug 23 is adapted to be rotatably or pivotally secured to a link of the chain 12 by means of a link plate 46 and a pair of link pins 47. The link plate 46 has a pair of spaced holes 48 that align with the through bore 43 and notch 44 so that the link pins 47 extend through the link plate 46 and through the bore and notch of the pusher lug 23. The pins 47 continue through the link of the chain 12 and are secured on the back thereof to mount the pusher lug to the chain. If the pusher lug is a member of the first longitudinally aligned array of lugs, it is mounted directly to the link of the chain 12. Conversely, if it is a member of the second longitudinally aligned array that is laterally displaced from the first array, a spacer block 49 having a pair of appropriately spaced holes is disposed between the pusher lug 23 and the link of the chain 12.

The crescent notch 44 in the pusher lug 23 has a detente 51 formed adjacent one end. The pusher lug in FIG. 4 is shown as it would appear on the lower flight of the conveyor chain and in its second or downwardly extending orientation. The detente 51 is sized and positioned such that when the pusher lug 23 is rotated in the direction of arrow 52 back to its first or inoperative position, the pin 47 within the crescent notch 44 snaps into place behind the detente 51 thus releasibly securing the pusher lug in place. Accordingly, and referring to FIG. 1, when the pusher lugs 23 encounter the pivot block 28, they are rotated back to their first positions and snap in place there by virtue of the detentes 51. As the pusher lugs move on around back toward the lower flight of the conveyor chain, the force of the engagement between the lugs and their respective retainer bars 24 and 39 dislodges the pins 47 from the detente 51 and rotates the pusher lugs back to their second downwardly extending operable positions.

FIG. 5 is an end view looking along the lower flight of the conveyor chain in FIG. 1. The pusher lug 23 is shown mounted to the chain 12 by means of link plate 46 and link pins 47. The pusher lug 23 is in its second downwardly extending position for engaging and stabilizing cartons on a carton path below. The pusher lug 23 rides along the lower surface of elongated retainer rod 24, which holds the pusher lug 23 in its downwardly extending position and prevents it from being moved or rotated back up as a result of the force exerted on the lug by the cartons.

FIG. 6 illustrates a view along the lower flight of the conveyor chain in the embodiment of FIG. 3 with the second retainer bar 39 shown in its downward operable position. The first aligned array of pusher lugs 23 are seen to be rotated to their downwardly extending positions riding just under the first elongated retainer bar 24. Similarly, the second longitudinally aligned array of pusher lugs 23 are seen to be fixed to the chain conveyor 12 by means of a link plate 46, link pins 47, and a spacer block 37. This array of pusher lugs is also seen in its downwardly extending operable position riding just below the lower edge of the second retainer bar 39. It will be understood that, in this orientation, the overhead pusher lug assembly is set up to accommodate narrower cartons having a width corresponding to the distance between adjacent pusher lugs on the conveyor chain.

Figure 7:
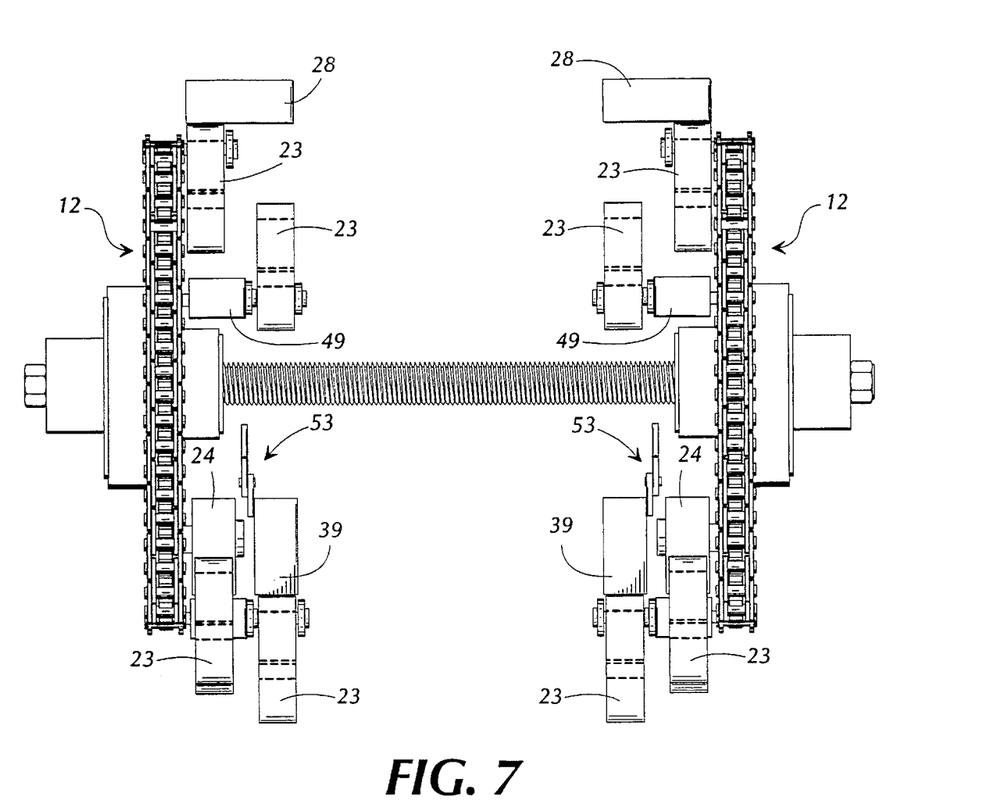
FIG. 7 is an end elevational view of the pusher lug assembly of this invention showing the offset pusher lug arrays and their aligned retainer bars.
Figure 7A:
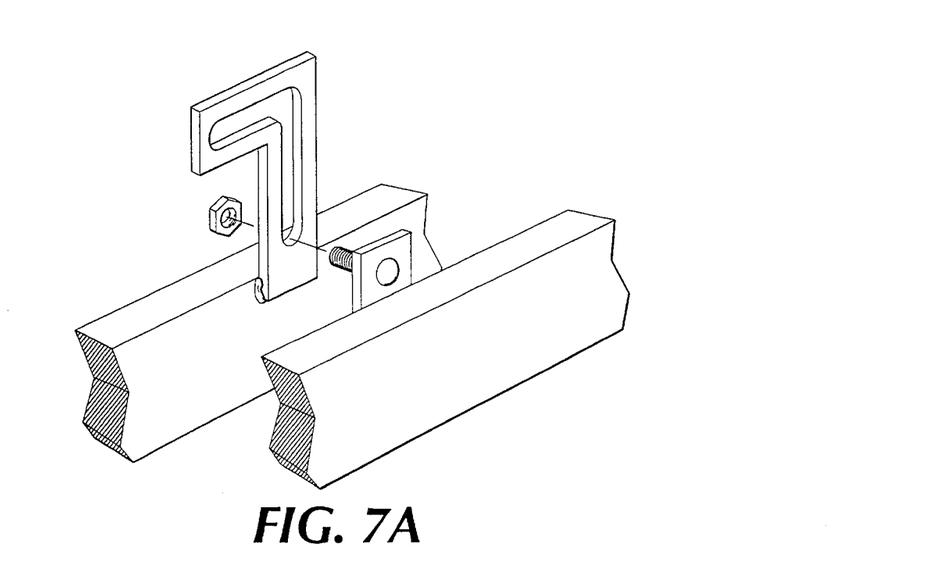
FIG. 7A illustrates a preferred assembly for mounting the retaining bars for easy retraction of one of the bars.

FIG. 7 is an end view of the overhead pusher lug assembly of this invention as seen from the upstream end thereof. The conveyor chains 12 are seen to be provided with pusher lugs 23 that are arranged in a first longitudinally aligned array adjacent to the chains and a second longitudinally aligned array spaced from the chains by spacer blocks 49. Each of the arrays of pusher lugs are laterally off-set from one another by a predetermined amount. The elongated retainer bars 24 and 39 are shown in their down or operable positions to rotate each pusher lug of the assembly into its downwardly extending operable position. The retainer bars 39 are coupled to the retainer bars 24 by means of a retracting mechanism 53, which allows the bars 39 to be raised upwardly and locked in an inoperable position if desired. The retracting mechanisms 53 can be of any appropriate type such as the L-bracket and pin arrangement of FIG. 7A. With such an arrangement, the second elongated rods 39 can simply be lifted up and to the left in FIG. 7A, whereupon their pins lock into place within the horizontal portions of the grooves. Pivot blocks 28 are seen in FIG. 7 to be positioned so that they engage the pusher lugs of both arrays along the upper flight of the pusher lug assembly to rotate and snap the pusher lugs back into their inwardly extending inoperable positions before they move back around to the lower flight of the pusher lug assembly.

The invention has been described herein in terms of preferred embodiments and methodologies. It will be understood by those of skill in this art, however, that the illustrated embodiments are exemplary only and that the invention is not limited by the particular configuration and features thereof. Numerous additions, deletions, and modifications might well be made to the illustrated embodiments without departing from the spirit and scope of the invention as set forth in the claims.

I claim:

1. An overhead pusher lug assembly for use in article packaging machines wherein cartons to be packed are conveyed sequentially along a path with a predetermined space being provided between each carton and its immediately trailing carton, said overhead pusher lug assembly being generally disposed above the carton path and comprising:

an endless flexible lug conveyor having an upper flight and a lower flight with said lower flight of said lug conveyor being positioned to overlie cartons on said path and being oriented substantially along the direction of carton movement;

said lug conveyor having an upstream end and a downstream end and being driven to move said lower flight of said conveyor from said upstream end to said downstream end at a rate synchronized with the rate at which cartons are conveyed along the path;

an array of pusher lugs rotatably mounted at spaced intervals along said lug conveyor;

each of said pusher lugs being rotatable on said conveyor between a first position wherein said lug projects generally upwardly from said lower flight of said conveyor in a direction away from the carton path and a second position wherein said lug projects generally downwardly from said lower flight of said conveyor in a direction toward the carton path;

said pusher lugs, when in their second positions, projecting into the spaces between cartons on the carton path with each downwardly projecting lug engaging the trailing edge of a carton on the path to stabilize the carton as it is conveyed along the path;

first means at the upstream end of said pusher lug assembly for rotating said pusher lugs from their first positions to their second positions as the lugs move onto said lower flight of said lug conveyor to insert the lugs into the spaces between leading and trailing cartons on the path and to avoid impact between the lugs and trailing cartons on the path; and second means on said pusher lug assembly for rotating said pusher lugs from their second positions back to their first positions after said pusher lugs have traversed said lower flight of said lug conveyor.

2. An overhead pusher lug assembly as claimed in claim 1 and wherein said endless flexible lug conveyor comprises a conveyor chain and wherein said pusher lugs are mounted at spaced intervals along said chain.

3. An overhead pusher lug assembly as claimed in claim 1 and wherein said pusher lugs are generally triangular in shape and are rotatably secured at their apexes to said lug conveyor.

4. An overhead pusher lug assembly as claimed in claim 1 and wherein said first means for rotating said pusher lugs comprises selector means for selecting and rotating preselected ones of said pusher lugs to accommodate cartons of differing sizes.

5. An overhead pusher lug assembly as claimed in claim 4 and wherein said selector means is configured for selectively rotating alternating ones of said pusher lugs.

6. An overhead pusher lug assembly as claimed in claim 1 and wherein said first means for rotating said pusher lugs comprises a first elongated retainer bar extending generally along said lower flight of said conveyor, said first retainer bar having an end portion disposed at the upstream end of said conveyor with said end portion being positioned to engage said pusher lugs as said lugs approach said lower flight to rotate said lugs into their second positions.

7. An overhead pusher lug assembly as claimed in claim 6 and wherein said first elongated retainer bar is positioned and oriented to bear against said rotated pusher lugs as said lugs move along said lower flight to hold the lugs firmly in their first positions as they progress along said lower flight.

8. An overhead pusher lug assembly as claimed in claim 6 and wherein alternating ones of said pusher lugs are offset relative to adjacent lugs forming a first longitudinally aligned array of lugs and a second longitudinally aligned array of lugs offset from the first aligned array and wherein said end portion of said first retainer bar is positioned to engage and rotate the lugs of said first aligned array of lugs, whereby every other lug is engaged and rotated by the end portion of the first retainer bar to accommodate cartons having a width corresponding to the distance between alternate lugs.

9. An overhead pusher lug assembly as claimed in claim 8 and further comprising a second elongated retainer bar extending generally along said lower flight of said conveyor, said second bar having an end portion and being selectively movable between a retracted position wherein said end portion is displaced from lugs on said conveyor and a operating position wherein said end portion is positioned to engage the pusher lugs of said second longitudinally aligned array as said lugs approach said lower flight to rotate the pusher lugs of said second array to their second positions, whereby when the second bar is in its operating position, the lugs of said first and second longitudinally aligned arrays are all rotated to their second positions for movement along the lower flight of the conveyor to accommodate cartons having a width corresponding to the distance between adjacent lugs on the conveyor.

10. An overhead pusher lug assembly for use in article packaging machines wherein cartons to be packed are conveyed in spaced sequential relationship along a path, said overhead pusher lug assembly being disposed generally above the carton path and comprising a pair of spaced endless flexible conveyors each having a lower flight and an upper flight with the lower flights of said flexible conveyors being substantially parallel relative to each other, positioned to overlie cartons on the path, oriented to extend along the direction of carton movement, and driven to move said lower flight of each conveyor in the direction of and at a rate corresponding to the rate of carton movement along the path, each of said flexible conveyors being provided with a plurality of lugs rotatably secured at spaced intervals along the conveyor with each lug being rotatable between a pushing orientation wherein a portion of said lug depends from the lower flight of said conveyor to extend between and engage cartons on the path and a retracted orientation wherein said lug is displaced from cartons on the path, a first cam means on said assembly for engaging and rotating said lugs from their retracted orientations to their pushing orientations as said lugs move onto said lower flight of said conveyors to insert the lugs between cartons on the path, and second cam means on said assembly for rotating said lugs from their pushing orientations back to their retracted orientations prior to engagement with said first cam means, whereby the lugs are rotated into the spaces between cartons so that the lugs do not impact and deform cartons onto the path.

11. The assembly of claim 10 and wherein said lugs on said lower flight of each of said conveyors are arranged in a first longitudinally aligned array and a second longitudinally aligned array with said first and second longitudinally aligned arrays being laterally displaced relative to each other and wherein said first cam means is positioned to engage and rotate to their pushing positions the lugs of said first longitudinally aligned array to accommodate cartons having a width corresponding to the distance between lugs in the first longitudinally aligned array.

12. The assembly of claim 11 and further comprising a third cam means on said assembly with said third cam means being selectively movable between a retracted position displaced from said lugs and an operable position wherein said third cam means engages and rotates to their pushing positions the lugs of said second longitudinally aligned array of lugs, whereby when said third cam means is in its operable position, the lugs of both longitudinally aligned arrays are rotated to their pushing orientations to accommodate cartons having widths corresponding to the distance between lugs on said conveyor.

* * * * *